United States Patent
Zhang et al.

(10) Patent No.: US 10,530,168 B2
(45) Date of Patent: Jan. 7, 2020

(54) CHARGING METHOD, CHARGING DEVICE AND TERMINAL

(71) Applicant: GUANGDONG OPPO MOBILE TELECOMMUNICATIONS CORP., LTD., Dongguan (CN)

(72) Inventors: Qiang Zhang, Dongguan (CN); Fanhong Kong, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 192 days.

(21) Appl. No.: 15/723,901

(22) Filed: Oct. 3, 2017

(65) Prior Publication Data
US 2018/0205250 A1    Jul. 19, 2018

(30) Foreign Application Priority Data
Jan. 13, 2017    (CN) .......................... 2017 1 0026132

(51) Int. Cl.
*H02J 7/00* (2006.01)
*H01M 10/44* (2006.01)
*H01M 10/48* (2006.01)

(52) U.S. Cl.
CPC ............ *H02J 7/0052* (2013.01); *H02J 7/007* (2013.01); *H01M 10/44* (2013.01);
(Continued)

(58) Field of Classification Search
USPC ....... 320/162, 134, 132, 136, 137, 107, 148, 320/155, 160, 128, 140, 109, 114, 152
See application file for complete search history.

(56) References Cited

U.S. PATENT DOCUMENTS

| 5,550,453 A | * | 8/1996 | Bohne | ................... H02J 7/0081 320/148 |
| 5,554,920 A | * | 9/1996 | Kokuga | ................ H01M 10/44 320/148 |

(Continued)

FOREIGN PATENT DOCUMENTS

| CN | 101364743 A | 2/2009 |
| CN | 101521401 A | 9/2009 |

(Continued)

OTHER PUBLICATIONS

European Patent Application No. 17197263.1 extended Search and Opinion dated Feb. 12, 2018, 11 pages.

(Continued)

*Primary Examiner* — Alexis B Pacheco
(74) *Attorney, Agent, or Firm* — Lathrop Gage LLP

(57) ABSTRACT

Embodiments of the present disclosure provide a charging method, a charging device and a terminal. The charging method includes: when detecting that a battery is charged with a trickle current, acquiring a voltage of the battery; determining a preset voltage range to which the voltage belongs; acquiring a charging current corresponding to the preset voltage range; and charging the battery according to the charging current. During a process that the battery is charged with the trickle current, the battery may be charged with a different charging current when the voltage of the battery belongs to a different voltage range, thereby improving the flexibility of a trickle current charge phase.

18 Claims, 5 Drawing Sheets

(52) U.S. Cl.
CPC ........ *H01M 10/441* (2013.01); *H01M 10/486* (2013.01); *H02J 7/0047* (2013.01); *H02J 7/0068* (2013.01); *H02J 7/0073* (2013.01); *H02J 7/0077* (2013.01)

(56) References Cited

U.S. PATENT DOCUMENTS

| | | | | |
|---|---|---|---|---|
| 2004/0095095 | A1* | 5/2004 | Yamamoto | H02J 7/045 320/128 |
| 2004/0164711 | A1* | 8/2004 | Hayashi | H02J 7/0055 320/134 |
| 2007/0188134 | A1* | 8/2007 | Hussain | H01M 10/44 320/114 |
| 2007/0299620 | A1* | 12/2007 | Yun | G01R 31/3842 702/63 |
| 2009/0009142 | A1* | 1/2009 | Nishikawa | H02J 7/0031 320/148 |
| 2009/0309547 | A1* | 12/2009 | Nakatsuji | H01M 10/441 320/134 |
| 2014/0125272 | A1* | 5/2014 | Weissinger | H02J 7/0077 320/107 |
| 2015/0123597 | A1 | 5/2015 | Son | |
| 2015/0364934 | A1 | 12/2015 | De-Milato et al. | |
| 2016/0239070 | A1* | 8/2016 | Oto | G06F 1/1626 |

FOREIGN PATENT DOCUMENTS

| | | |
|---|---|---|
| CN | 105162181 A | 12/2015 |
| CN | 106208213 A | 12/2016 |
| CN | 106786958 A | 5/2017 |
| JP | H11308779 A | 11/1999 |
| JP | 2006351489 A | 12/2006 |
| JP | 2007259632 A | 10/2007 |
| WO | WO 2012008247 A1 | 1/2012 |

OTHER PUBLICATIONS

PCT/CN2017/106570 International Search Report and Written Opinion dated Jan. 23, 2018, 12 pages.

Indian Patent Application No. 201734036950, Office Action dated Nov. 5, 2019, 6 pages.

* cited by examiner

CHARGING METHOD, CHARGING DEVICE AND TERMINAL

CROSS REFERENCE TO RELATED APPLICATION

This application is based upon and claims priority and benefits of Chinese Patent Application No. 201710026132.5, filed with State Intellectual Property Office on Jan. 13, 2017, the entire content of which is incorporated herein by reference.

TECHNICAL FIELD

The present disclosure relates to the charging technology field, and more particularly, to a charging method, a charging device and a terminal.

BACKGROUND

Most mobile terminals employ a lithium battery. A process for charging the lithium battery may have 4 phases, which may be a trickle current charge phase, a constant current charge phase, a constant voltage charge phase and a charge termination phase. The process for charging the lithium battery is controlled by an IC (Integrated Circuit) chip. When it starts to charge the lithium battery, the IC chip may detect a voltage of the lithium battery. When the voltage is less than an initial voltage of the constant current charge phase, the lithium battery is charged with a trickle current. Only when it is detected that the voltage of the lithium battery reaches the initial voltage of the constant current charge phase, the constant current charge phase is entered into from the trickle current charge phase. However, in related arts, flexibility of charging the lithium battery with the trickle current by a terminal is poor.

SUMMARY

Embodiments of the present disclosure provide a charging method. The charging method includes: when detecting that a battery is charged with a trickle current, acquiring a voltage of the battery; determining a preset voltage range to which the voltage belongs; acquiring a charging current corresponding to the preset voltage range; and charging the battery according to the charging current.

Embodiments of the present disclosure provide a terminal. The terminal includes: a memory, a processor, and computer programs stored in the memory and executable by the processor. The processor is configured to execute the computer programs to realize a charging method provided in embodiments of the present disclosure.

Embodiments of the present disclosure provide a non-transitory computer-readable storage medium having stored therein instructions that, when executed by a processor of a mobile terminal, causes the mobile terminal to perform a charging method, and the charging method including: when detecting that a battery is charged with a trickle current, acquiring a voltage of the battery; determining a preset voltage range to which the voltage belongs; acquiring a charging current corresponding to the preset voltage range; and charging the battery according to the charging current.

BRIEF DESCRIPTION OF THE DRAWINGS

Exemplary embodiments of the present disclosure will be described in detail with reference to drawings below, which may make technical solutions and advantages of the present disclosure more apparent.

DETAILED DESCRIPTION

Figure 1:
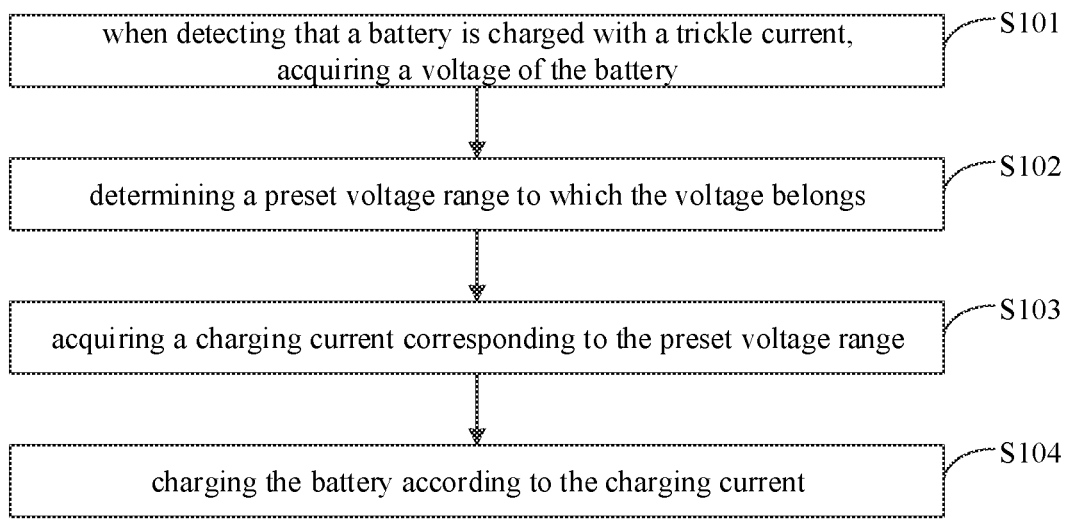
FIG. 1 is a flow chart illustrating a charging method according to embodiments of the present disclosure.

With reference to drawings, the same or similar elements and the elements having same or similar functions are denoted by like reference numerals. The principle of the present disclosure is described by applying embodiments of the present disclosure to suitable computing environments. Following descriptions are based on exemplary embodiments of the present disclosure, which should not be construed to limit other embodiments that are not illustrated in the present disclosure.

The charging method, the charging device and the terminal are described in detail below.

With reference to FIG. 1, which is a flow chart illustrating a charging method according to embodiments of the present disclosure, the flow may include followings.

At block 101, when detecting that a battery is charged with a trickle current, a voltage of the battery is acquired.

It should be understood that, an execution body of the embodiments of the present disclosure may be a terminal device, such as a smart phone, a tablet computer and the like.

For example, most mobile terminals employ a lithium battery. A process for charging the lithium battery may have 4 phases, which may be a trickle current charge phase, a constant current charge phase, a constant voltage charge phase and a charge termination phase. The process for charging the lithium battery is controlled by an IC (Integrated Circuit) chip. When it starts to charge the lithium battery, the IC chip may detect a voltage of the lithium battery. When the voltage is less than an initial voltage of the constant current charge phase, the lithium battery is charged with a trickle current. Only when it is detected that the voltage of the lithium battery reaches the initial voltage of the constant current charge phase, the constant current charge phase is entered into from the trickle current charge phase. However, in related arts, flexibility of charging the lithium battery with the trickle current through a terminal is poor.

The terminal may acquire the voltage of the battery during a process that the battery is charged with the trickle current in block 101.

At block 102, a preset voltage range to which the voltage belongs is determined.

For example, after the voltage of the battery is acquired, the terminal may be triggered to determine the preset voltage range to which the voltage belongs. That is, it is necessary to determine which preset voltage range the voltage belongs to.

In a possible implementation, the terminal may preset a plurality of voltage ranges corresponding to the trickle current charge phase and may determine the plurality of voltage ranges as a plurality of preset voltage ranges. For example, the plurality of preset voltage ranges may include [2.5, 2.8], [2.8, 3.1] and [3.1, 3.4].

At block 103, a charging current corresponding to the preset voltage range is acquired.

At block 104, the battery is charged according to the charging current.

For example, blocks 103 and 104 may include followings.

After the preset voltage range to which the voltage of the battery belongs is determined, the terminal may acquire the charging current corresponding to the preset voltage range and may charge the battery according to the charging current.

In a possible implementation, the terminal may determine the plurality of preset voltage ranges in advance and may preset a plurality of charging currents for the plurality of preset voltage ranges correspondingly by performing followings.

Voltage samples are acquired during the trickle current charge phase, and a plurality of voltage ranges are generated by sequencing the voltage samples from low to high.

The plurality of voltage ranges are determined as the plurality of preset voltage ranges.

A plurality of charging currents corresponding to the plurality of preset voltage ranges are set. The higher a preset voltage range is, the higher a corresponding charging current is.

For example, a user may input the voltage samples corresponding to the trickle current charge phase to the terminal. The terminal may generate the plurality of voltage ranges by sequencing the voltage samples from low to high. For example, four voltage samples input by the user may be 2.5V, 2.8V, 3.1V and 3.4V. The terminal may generate three voltage ranges of [2.5, 2.8], [2.8, 3.1] and [3.1, 3.4] according to the four voltage samples. The terminal may determine the three voltage ranges as the preset voltage ranges.

After the plurality of preset voltage ranges are determined, the terminal may set the plurality of charging currents corresponding to the plurality of preset voltage ranges. The higher the preset voltage range is, the higher the corresponding charging current is. For example, the charging current corresponding to the preset voltage range of [2.5, 2.8] set by the terminal is 50 mA, the charging current corresponding to the preset voltage range of [2.8, 3.1] set by the terminal is 250 mA, and the charging current corresponding to the preset voltage range of [3.1, 3.4] set by the terminal is 550 mA.

The terminal may generate a correspondence table according to the preset voltage ranges and the charging currents. The correspondence table is determined as a preset first correspondence table. For example, the preset first correspondence table may be illustrated as Table 1.

TABLE 1 correspondence table between preset
voltage ranges and charging currents

| voltage range | charging current |
| --- | --- |
| [2.5, 2.8] | 50 mA |
| [2.8, 3.1] | 250 mA |
| [3.1, 3.4] | 550 mA |

Furthermore, in another possible implementation, the charging current corresponding to the preset voltage range set by the terminal may be a linear variable instead of a constant value. For example, the charging current corresponding to the preset voltage range of [2.8, 3.1] set by the terminal may be a variable linearly increased from 100 mA to 350 mA.

Certainly, the charging currents corresponding to some of the preset voltage ranges may be set as constant values, while the charging currents corresponding to a remaining of the preset voltage ranges may be set as values increased linearly.

For example, when it is detected that the battery is charged, the voltage of the battery acquired by the terminal is 2.6V. An initial voltage of the constant current charge phase is 3.4V. In this case, it needs to charge the battery with the trickle current through the terminal firstly.

During the process that the battery is charged with the trickle current, the terminal may acquire the voltage of the battery in real time and may determine the preset voltage range to which the voltage of the battery belongs. The terminal may acquire the charging current corresponding to the preset voltage range the battery is charged according to the charging current.

For example, when it starts to charge the battery with the trickle current, the terminal determines that the acquired voltage of 2.6V belongs to the preset voltage range of [2.5, 2.8]. The terminal may acquire that the charging current corresponding to the preset voltage range of [2.5, 2.8] is 50 mA by searching for in the preset first correspondence table (such as table 1), which may be. The battery may be charged according to the charging current of 50 mA through the terminal.

After a period of time, the voltage of the battery acquired by the terminal may increase to 2.81V. It is determined that the voltage of 2.81V belongs to the preset voltage range of [2.8, 3.1]. The terminal may acquire that the charging current corresponding to the preset voltage range of [2.8, 3.1] is 250 mA by searching for in the preset first correspondence table. The battery may be charged according to the charging current of 250 mA through the terminal.

When the voltage acquired by the terminal belongs to the preset voltage range of [3.1, 3.4], the battery may be charged according to the charging current of 550 mA through the terminal.

It should be understood that, in embodiments of the present disclosure, when the battery is charged with the trickle current through the terminal, the battery may be charged according to a different charging current based on a different preset voltage range to which the voltage of the battery belongs to. Therefore, the flexibility of the trickle current charge phase is improved in the embodiments of the present disclosure.

In addition, the charging current may increase corresponding to different voltage ranges. Therefore, a charging speed of the trickle current charge phase is improved in the embodiments of the present disclosure.

Figure 2:
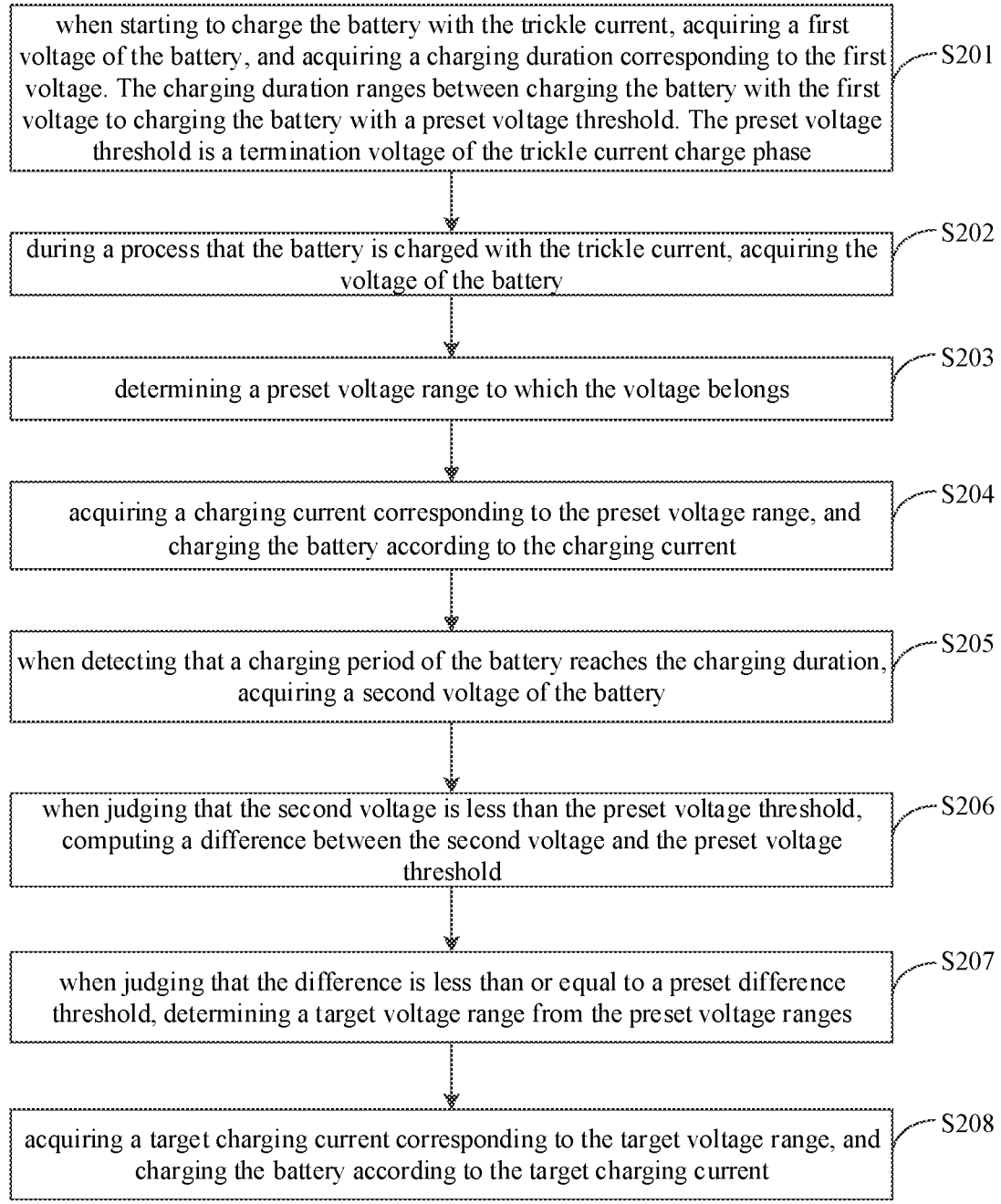
FIG. 2 is another flow chart illustrating a charging method according to embodiments of the present disclosure.

With reference to FIG. 2, which is another flow chart illustrating a charging method according to embodiments of the present disclosure, the flow may include followings.

At block 201, when it starts to charge the battery with the trickle current, a first voltage of the batter is acquired by the terminal and a charging duration corresponding to the first voltage is acquired by the terminal. The charging duration ranges between charging the battery with the first voltage to charging the battery with a preset voltage threshold. The preset voltage threshold is a termination voltage of the trickle current charge phase.

In a possible implementation, before block S201 is performed, the terminal may perform followings.

Voltage samples are acquired by the terminal during the trickle current charge phase. The voltage samples are sequenced from low to high, so as to generate a plurality of voltage ranges.

The plurality of voltage ranges are determined as the plurality of preset voltage ranges by the terminal.

A plurality of charging currents corresponding to the plurality of preset voltage ranges are set by the terminal. The higher the preset voltage range is, the higher the corresponding charging current is.

For example, the terminal receives a plurality of voltage samples during the trickle current charge phase input by the user. The voltage samples may be sequenced from low to high by the terminal to generate the plurality of voltage ranges. For example, the voltage samples received by the terminal may be 2.5V, 2.8V, 3.1V and 3.4V. Three voltage ranges of [2.5, 2.8], [2.8, 3.1], [3.1, 3.4] are generated by the terminal according to the four voltage samples. The three voltage ranges are determined as the preset voltage ranges by the terminal.

After the plurality of preset voltage ranges are determined, the terminal may set the plurality of charging currents corresponding to the plurality of preset voltage ranges. The higher the preset voltage range is, the higher the corresponding charging current is. For example, the charging current corresponding to the preset voltage range of [2.5, 2.8] set by the terminal is 50 mA, the charging current corresponding to the preset voltage range of [2.8, 3.1] set by the terminal is 250 mA, and the charging current corresponding to the preset voltage range of [3.1, 3.4] set by the terminal is 550 mA.

A correspondence table may be generated by the terminal according to the preset voltage ranges and the charging currents. The correspondence table may be determined as a preset first correspondence table.

For example, the preset first correspondence table may be illustrated as the above Table 1, which is omitted herein.

For example, when it is detected that the battery is charged with the trickle current, the first voltage of the battery when it starts to charge the battery with the trickle current may be acquired by the terminal. The charging duration corresponding to the first voltage is acquired by the terminal. The charging duration ranges between charging the battery with the first voltage to charging the battery with a preset voltage threshold. The preset voltage threshold is a termination voltage of the trickle current charge phase. For example, the preset voltage threshold may be 3.4V. Certainly, the example described herein is not construed to limit the present disclosure.

That is, when it starts to charge the battery with the trickle current, the terminal may be triggered to acquire the voltage (i.e. the first voltage) of the battery. The charging duration corresponding to the first voltage is acquired by the terminal. The charging duration is a duration ranging between charging the battery with the first voltage to charging the battery with the preset voltage threshold.

It is to be illustrated that, the charging duration is an estimated time period.

For example, in a possible implementation, a correspondence table may be generated by the terminal in advance, which records charging durations taken by charging the battery from different voltages to the preset voltage threshold. For example, a manufacturer may measure the charging durations taken by charging the battery from different voltages to the preset voltage threshold of 3.4V according to the charging currents which correspond to the preset voltage ranges and are in an increasing mode. For example, the battery may be charged according to the charging current of 50 mA corresponding to the voltage range of [2.5, 2.8], according to the charging current of 250 mA corresponding to the voltage range of [2.8, 3.1], and according to the charging current of 550 mA corresponding to the voltage range of [3.1, 3.4].

The first voltages and the corresponding charging durations are input into the terminal according to their correspondences. After the first voltages and the corresponding charging durations are received by the terminal, a correspondence table may be generated. The correspondence table between the first voltages and the charging durations is determined as a preset second correspondence table.

For example, the preset second correspondence table may be illustrated as Table 2.

TABLE 2 correspondence table between first voltages and estimated charging durations during the trickle current charge phase

| first voltage (V) | estimated charging duration during the trickle current charge phase (minute) |
| --- | --- |
| 2.5 | 34 |
| 2.6 | 28 |
| 2.7 | 22 |
| 2.8 | 16 |
| 2.9 | 13 |
| 3.0 | 10.5 |
| 3.1 | 7.6 |
| 3.2 | 5.5 |
| 3.3 | 3.3 |

For example, when it starts to charge the battery with the trickle current, the first voltage of the battery acquired by the terminal is 2.6V. By searching for in the Table 2, the terminal acquires that the charging duration taken by charging the battery from 2.6V to 3.4V is about 28 minutes.

At block 202, during a process that the battery is charged with the trickle current, the voltage of the battery is acquired by the terminal.

At block 203, a preset voltage range to which the voltage belongs is determined by the terminal.

At block 204, a charging current corresponding to the preset voltage range is acquired by the terminal and the battery is charged according to the charging current through the terminal.

For example, blocks S202, S203 and S204 may include followings.

During the trickle current charge phase that the battery is charged with the trickle current, the voltage of the battery may be acquired by the terminal in real time. And the preset voltage range to which the voltage belongs is determined by the terminal. The charging current corresponding to the preset voltage range may be acquired by the terminal. The battery is charged according to the charging current through the terminal.

For example, when the voltage of the battery acquired by the terminal is 2.7V, it is determined that the voltage of 2.7V belongs to the preset voltage range of [2.5, 2.8] by the terminal. By searching for in Table 1, the charging current of 50 mA corresponding to the preset voltage range of [2.5, 2.8] is acquired by the terminal. The battery is charged according to the charging current of 50 mA through the terminal. When the voltage of the battery acquired by the terminal increases to 2.81V, it is determined that voltage of 2.81V belongs to the preset voltage range of [2.8, 3.1] by the terminal. By searching for in Table 1, the charging current of 250 mA corresponding to the preset voltage range of [2.8, 3.1] is acquired by the terminal. The battery is charged according to the charging current of 250 mA through the terminal.

At block 205, when it is detected that a charging period of the battery reaches to the charging duration, a second voltage of the battery is acquired by the terminal.

For example, during a process that the battery is charged, when detecting that the charging period of the battery reaches to the charging duration acquired in block 201, the terminal is triggered to acquire the second voltage of the battery and to judge whether the second voltage is greater than or equal to the preset voltage threshold.

For example, the charging duration estimated in block S201 is 28 minutes. When the charging period of the battery reaches 28 minutes, the terminal is triggered to acquire the second voltage of the battery and to judge whether the second voltage of the battery is greater than or equal to the preset voltage threshold of 3.4V.

When it is judged that the second voltage is equal to or greater than the preset voltage threshold of 3.4V, the terminal may enter the constant current charge phase.

When it is judged that the second voltage is less than the preset voltage threshold of 3.4V, block S206 is performed.

At block 206, when it is judged that the second voltage is less than the preset voltage threshold, a difference between the second voltage and the preset voltage threshold is computed by the terminal.

At block 207, when it is judged that the difference is less than or equal to a preset difference threshold, a target voltage range is determined from the preset voltage ranges.

At block 208, a target charging current corresponding to the target voltage range is acquired by the terminal and the battery is charged according to the target charging current through the terminal.

For example, blocks 206, 207 and 208 may include followings.

When the charging period of the battery reaches 28 minutes, if it is judged that the second voltage of the battery is less than the preset voltage threshold, it may be considered that a discharging current of the battery is relatively large during the trickle current charge phase, such that the charging duration of the trickle current charge phase is long. The difference between the second voltage and the preset voltage threshold may be computed by the terminal. It is judged whether the difference is less than or equal to the preset difference threshold.

When it is judged that the difference is less than or equal to the preset difference threshold, it may be indicated that the second voltage is close to the preset voltage threshold. In this case, the terminal may determine the target voltage range from the preset voltage ranges, and may acquire the target charging current corresponding to the target voltage range. The battery may be charged according to the target charging current.

For example, when it starts to charge the battery with the trickle current, the first voltage of the battery acquired by the terminal is 2.6V. The charging duration ranging between charging the battery with 2.6V to charging the battery with 3.4V, which is acquired by the terminal, is 28 minutes correspondingly. When the charging period of the battery reaches 28 minutes, the second voltage of the battery acquired by the terminal is 3.0V. That is, the second voltage is less than the preset voltage threshold of 3.4V. The second voltage less than the preset voltage threshold may be caused by a usage of the terminal by the user when the battery is charged with the trickle current. As a result, the discharging current is relatively large to slower a charging speed of the trickle current charge phase.

The difference between the second voltage of 3.0V and the preset voltage threshold of 3.4V may be computed by the terminal. The difference computed by the terminal is 0.4V. It is judged whether the difference of 0.4V is less than the preset difference threshold by the terminal. For example, the preset difference threshold is 0.4V. As the difference of 0.4V equals to the preset difference threshold, the terminal may be triggered to determine the preset voltage range of [3.1, 3.4] as the target voltage range. The target charging current corresponding to the target voltage range of [3.1, 3.4] is acquired as 550 mA. The battery is charged according to the target charging current of 550 mA.

It should be understood that, as the second voltage of 3.0V belongs to the preset voltage range of [2.8, 3.1], when the battery is charged according to the charging current corresponding to the preset voltage range of [2.8, 3.1], the battery is charged according to the charging current of 250 mA. However, in the embodiments of the present disclosure, as the second voltage of 3.0V is close to the preset voltage threshold of 3.4V, the battery is charged according to the charging current of 550 mA corresponding to the preset voltage range of [3.1, 3.4]. Therefore, the charging speed of the trickle current charge phase may be improved.

In a possible implementation, the terminal may perform followings.

When it is judged that the difference is larger than the preset difference threshold, the discharging current is acquired.

Furthermore, when it is detected that the discharging current exceeds a preset discharging current threshold, a prompt message is generated. The prompt message is configured to prompt the user to stop using the terminal so as to improve the charging speed.

For example, when the second voltage acquired by the terminal is 2.9V, the difference computed by the terminal between the second voltage of 2.9V and the preset voltage threshold of 3.4V is 0.5V. The difference of 0.5V is greater than the preset difference threshold of 0.4V. It may be considered that this case is caused by the usage of the terminal when the battery is charged. For example, applications having huge power consumption are opened, resulting in a low charging speed.

The discharging current may be acquired by the terminal and it is detected whether the discharging current exceeds the preset discharging current threshold.

When it is detected that the discharging current exceeds the preset discharging current threshold (for example, the discharging current is 210 mA, and the preset discharging current threshold is 200 mA), the prompt message is generated by the terminal. The prompt message is configured to prompt the user to stop using the terminal so as to improve the charging speed of the trickle current charge phase.

When it is detected that the discharging current does not exceed the discharging current threshold, the charging current may be increased by the terminal according to a preset strategy. For example, the charging current may be increased by 50% to improve the charging speed.

In another possible implementation, after the prompt message is generated by the terminal, the terminal may perform followings.

The terminal is controlled to enter a preset low-power-consumption mode.

For example, after the prompt message is output to prompt the user to stop using the terminal, the terminal may enter the preset low-power-consumption mode, thereby further improving the charging speed of the trickle current charge phase.

It is to be illustrated that, controlling the terminal to enter the preset low-power-consumption mode may be that a display brightness of the terminal is reduced, a volume of the terminal is reduced and the like.

Figure 3A:
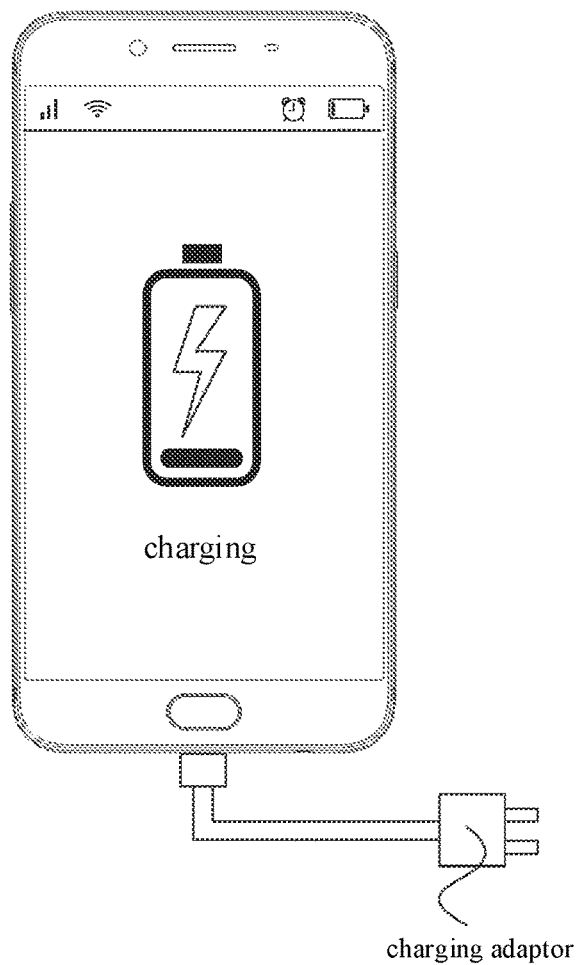
FIGS. 3A to 3C are schematic diagrams illustrating scenarios of a charging method according to embodiments of the present disclosure.
Figure 3B:
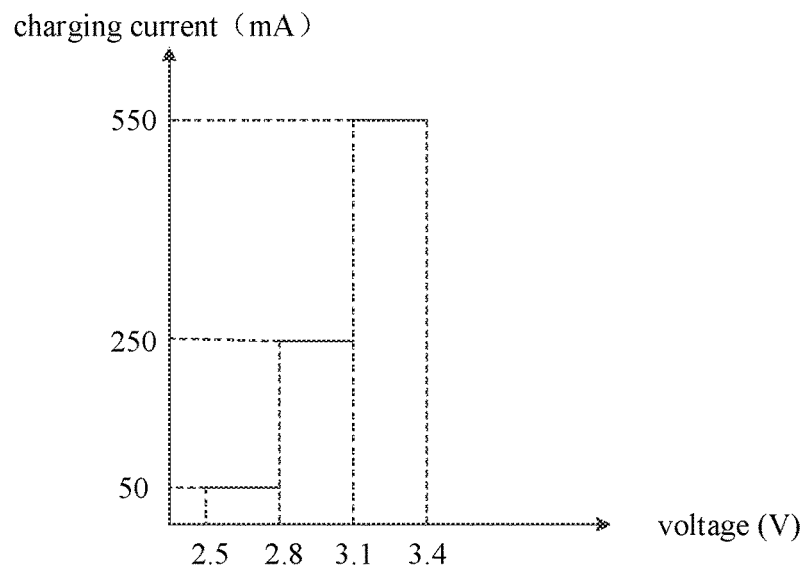
Figure 3C:
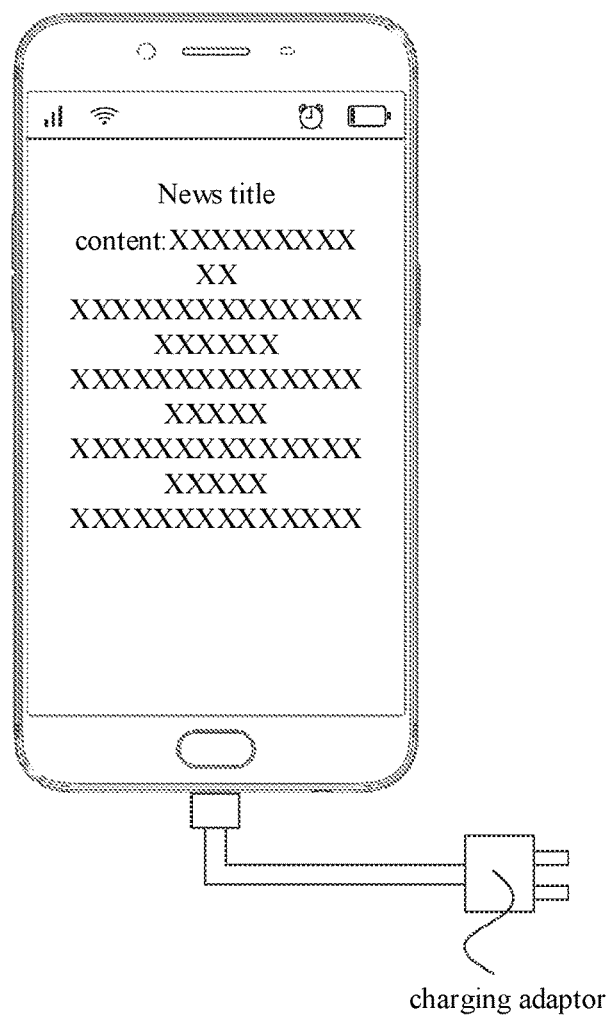

With reference to FIGS. 3A to 3C, scenarios of using the charging method are illustrated. FIGS. 3A to 3C are schematic diagrams illustrating scenarios of a charging method according to embodiments of the present disclosure.

For example, the user connects a charging adapter with the terminal for charging the battery, as illustrated in FIG. 3A. The terminal may be triggered to acquire the voltage of the battery.

After the voltage of the battery is acquired, the terminal may judge whether the voltage is less than the preset voltage threshold. The preset voltage threshold is the initial voltage when the terminal enters the constant current charge phase. That is, when it is judged that the voltage of the battery is less than the preset voltage threshold by the terminal, the terminal may enter the trickle current charge phase. When it is judged that the voltage of the battery is not less than the preset voltage threshold by the terminal, it does not need to charge the battery with the trickle current through the terminal. The terminal enters the constant current charge phase. For example, the preset voltage threshold may be 3.4V.

For example, the voltage of the battery acquired by the terminal is 2.6V. As the voltage of 2.6V is less than the preset voltage threshold of 3.4V, it needs to charge the battery with the trickle current through the terminal.

When it starts to charge the battery with the trickle current, the first voltage of the battery may be acquired by the terminal. For example, the first voltage of the battery acquired by the terminal is 2.6V. The terminal may search for in the preset correspondence table according to the first voltage of 2.6V and may acquire the charging duration corresponding to the first voltage of 2.6V. The charging duration is estimated by charging the battery from the first voltage to the preset voltage threshold of 3.4V. For example, the terminal may acquire that the charging duration corresponding to the first voltage of 2.6V is 28 minutes. That is, about 28 minutes is taken to charge the battery from the first voltage to the preset voltage threshold of 3.4V.

During the process that the battery is charged with the trickle current, the terminal may acquire the voltage of the battery in real time and may determine the preset voltage range to which the voltage of the battery belongs. The terminal may acquire the charging current corresponding to the preset voltage range and may charge the battery according to the charging current.

For example, the preset voltage ranges may include [2.5, 2.8], [2.8, 3.1], [3.1, 34]. The charging currents corresponding to the preset voltage ranges are 50 mA, 250 mA and 550 mA.

Based on the preset voltage ranges and the charging currents, the battery may be charged through the terminal according to the charging current of 50 mA when the voltage of the battery belongs to the preset voltage range of [2.5, 2.8]. The battery may be charged through the terminal according to the charging current of 250 mA when the voltage of the battery belongs to the preset voltage range of [2.8, 3.1]. The battery may be charged through the terminal according to the charging current of 550 mA when the voltage of the battery belongs to the preset voltage range of [3.1, 34]. A correspondence table between the voltages and the charging currents may be illustrated as FIG. 3B.

For example, during the process that the battery is charged with the trickle current, the user is browsing news by using the terminal, illustrated as FIG. 3C. It should be understood that, during the process that the battery is charged with the trickle current, a usage of the terminal to browse news may result in a low charging speed of the trickle current charge phase.

When it is detected that the charging period of the battery reaches the estimated charging duration of 28 minutes, the terminal may be triggered to acquire the second voltage of the battery. It is judged whether the second voltage is less than the preset voltage threshold of 3.4V.

For example, the second voltage acquired by the terminal is 3.0V which is less than 3.4V. In this case, the terminal may compute the difference between the second voltage and the preset voltage threshold of 3.4V. For example, the difference computed by the terminal is 0.4V.

After the difference of 0.4V is computed, it may be judged whether the difference is less than or equal to the preset difference threshold by the terminal. For example, the preset difference threshold is 0.4V. As the difference equals to the preset difference threshold, the terminal may be triggered to determine the target voltage range from the preset voltage ranges. The target charging current corresponding to the target voltage range may be acquired by the terminal. The battery is charged according to the target charging current. For example, when the target voltage range is [3.1, 3.4], the battery may be charged through the terminal according to the target charging current of 550 mA corresponding to the target voltage range of [3.1, 3.4].

It should be understood that, when the trickle charge is performed to the battery, the user is browsing news on the terminal. So when battery is charged for 28 minutes, the voltage of the battery is 3.0V only. Therefore, comparing with a manner that the battery is charged according to the charging current of 250 mA corresponding to the voltage range of [2.8, 3.1] and then charged according to the charging current of 550 mA corresponding to the voltage range of [3.1, 3.4], a manner that the battery is charged according to the charging current of 550 mA corresponding to the voltage range of [3.1, 3.4] provided in the embodiments of the present disclosure may improve the charging speed of the trickle current charge phase.

Embodiments of the present disclosure further provide a charging device based on the above charging method. Meanings of same terms included the charging device are the same with that included in the charging method. Details may be referred to descriptions of method embodiments.

Figure 4:
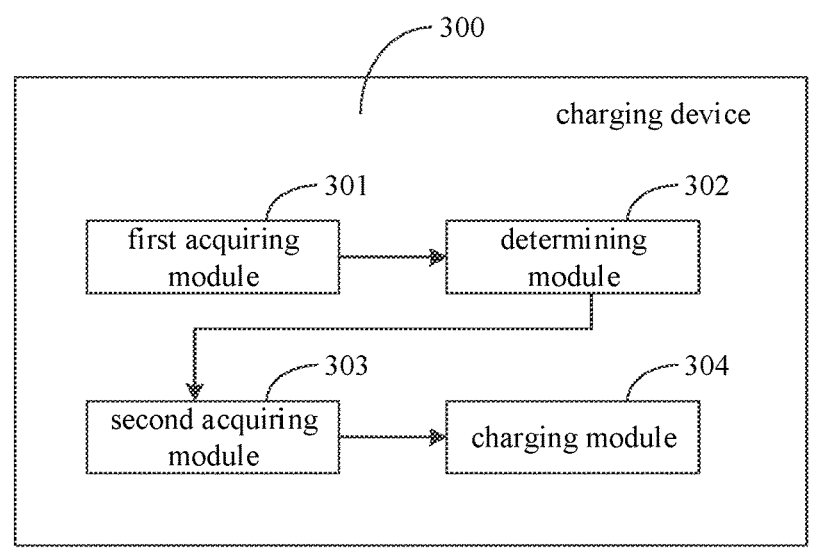
FIG. 4 is a schematic diagram illustrating a charging device according to embodiments of the present disclosure.

With reference to FIG. 4, FIG. 4 is a schematic diagram illustrating a charging device according to embodiments of the present disclosure. The charging device 300 may include a first acquiring module 301, a determining module 302, a second acquiring module 303, and a charging module 304.

The first acquiring module 301 is configured to acquire a voltage of a battery when it is detected that the battery is charged with a trickle current.

For example, when it is detected that the battery is charged with the trickle current, the first acquiring module 301 of the terminal may acquire the voltage of the battery in real time. That is, during a process that the battery is charged with the trickle current, the first acquiring module 301 of the terminal may acquire the voltage of the battery in real time.

The determining module 302 is configured to determine a preset voltage range to which the voltage belongs.

For example, after the voltage of the battery is acquired by the first acquiring module 301, the determining module 302 may be triggered to determine the preset voltage range to which the voltage of the battery belongs.

For example, in a possible implementation, the terminal may preset a plurality of voltage ranges corresponding to the trickle current charge phase and may determine the plurality of voltage ranges as a plurality of preset voltage ranges. For example, the plurality of preset voltage ranges may include [2.5, 2.8], [2.8, 3.1], and [3.1, 3.4].

The second acquiring module 303 is configured to acquire a charging current corresponding to the preset voltage range.

The charging module 304 is configured to charge the battery according to the charging current.

For example, after the preset voltage range to which the voltage belongs is determined by the determining module 302, the second acquiring module 303 may acquire the charging current corresponding to the preset voltage range. The battery is charged by the charging module 304 according to the charging current.

It is to be understood that, in the embodiments of the present disclosure, during the process that the battery is charged with the trickle current through the terminal, the battery may be charged with a different charging current corresponding to a different voltage range to which the voltage belongs. Therefore, flexibility of the trickle current charge phase is improved in the embodiments of the present disclosure.

In a possible implementation, increased charging currents may be set for different preset voltage ranges by the terminal. For example, for the preset voltage range of [2.5, 2.8], the charging module 304 may charge the battery according to the charging current of 50 mA. For the preset voltage range of [2.8, 3.1], the charging module 304 may charge the battery according to the charging current of 250 mA. For the preset voltage range of [3.1, 3.4], the charging module 304 may charge the battery according to the charging current of 550 mA.

It should be understood that, for different voltage ranges, the charging current increases. Therefore, the charging speed of the trickle current charge phase may be improved in the embodiments of the present disclosure.

Figure 5:
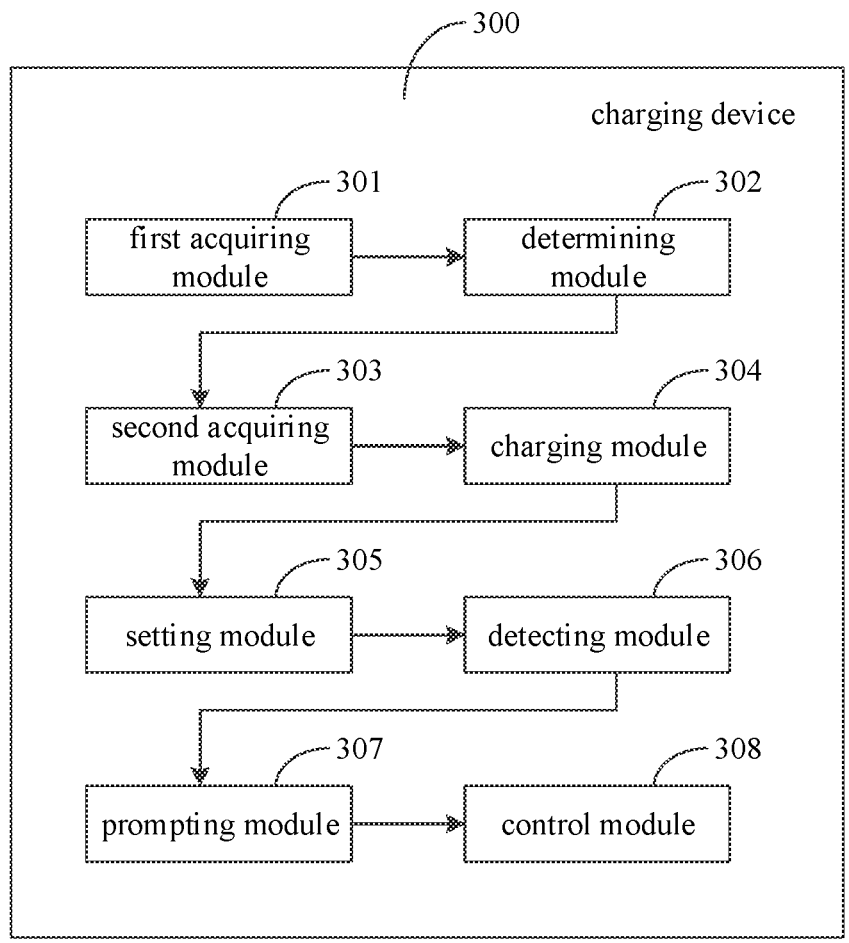
FIG. 5 is another schematic diagram illustrating a charging device according to embodiments of the present disclosure.

With reference to FIG. 5, FIG. 5 is another schematic diagram illustrating a charging device according to embodiments of the present disclosure. In an embodiment, the charging device 300 may further includes: a setting module 305, a detecting module 306, a prompting module 307 and a control module 308.

The setting module 305 is configured to acquire voltage samples during a trickle current charge phase that the battery is charged with the trickle current, to generate a plurality of voltage ranges by sequencing the voltage samples from low to high, to determine the plurality of voltage ranges as a plurality of preset voltage ranges, and to set a plurality of charging currents for the plurality of preset voltage ranges. The higher the preset voltage range is, the higher the corresponding charging current is.

For example, a user may input the voltage samples corresponding to the trickle current charge phase to the terminal. After acquiring the voltage samples, the setting module 305 of the terminal may generate the plurality of voltage ranges by sequencing the voltage samples from low to high. For example, four voltage samples input by the user may be 2.5V, 2.8V, 3.1V and 3.4V. The setting module 305 may generate three voltage ranges of [2.5, 2.8], [2.8, 3.1] and [3.1, 3.4] according to the four voltage samples. The setting module 305 may determine the three voltage ranges as the preset voltage ranges.

After the plurality of preset voltage ranges are determined, the setting module 305 may set the plurality of charging currents corresponding to the plurality of preset voltage ranges. The higher the preset voltage range is, the higher the corresponding charging current is. For example, the charging current corresponding to the preset voltage range of [2.5, 2.8] set by the terminal is 50 mA, the charging current corresponding to the preset voltage range of [2.8, 3.1] set by the terminal is 250 mA, and the charging current corresponding to the preset voltage range of [3.1, 3.4] set by the terminal is 550 mA.

The terminal may generate a correspondence table according to the preset voltage ranges and the charging currents. The correspondence table is determined as a preset first correspondence table. For example, the preset first correspondence table may be illustrated as the above Table 1, which is omitted herein.

The detecting module 306 is configured to acquire a first voltage of the battery when it starts to charge the battery with the trickle current, and to acquire a charging duration corresponding to the first voltage. The charging duration ranges between charging the battery with the first voltage to charging the battery with a preset voltage threshold. The preset voltage threshold is a termination voltage of the trickle current charge phase. The detecting module 306 is configured to acquire a second voltage of the battery when it is detected that a charging period of the battery reaches the charging duration. The detecting module 306 is configured to compute a difference between the second voltage and the preset voltage threshold when it is judged that the second voltage is less than the preset voltage threshold. The detecting module 306 is configured to determine a target voltage range from the preset voltage ranges when it is judged that the difference is less than or equal to a preset difference threshold, to acquire a target charging current corresponding to the target voltage range, and to charge the battery according to the target charging current.

For example, when it is detected that the battery is charged with the trickle current, the detecting module 306 may acquire the first voltage of the battery when it starts to charge the battery with the trickle current, and may acquire the charging duration corresponding to the first voltage. The charging duration ranges between charging the battery with the first voltage to charging the battery with the preset voltage threshold. The preset voltage threshold is the termination voltage of the trickle current charge phase. For example, the preset voltage threshold may be 3.4V.

That is, when it starts to charge the battery with the trickle current, the detecting module 306 may be triggered to acquire the voltage (i.e. the first voltage) of the battery. The detecting module 306 may acquire the charging duration according to the first voltage. The charging duration ranges between charging the battery with the first voltage to charging the battery with the preset voltage threshold.

It is to be illustrated that, the charging duration is an estimated time period. For example, after the first voltage is acquired by the detecting module 306, the charging duration according to the first voltage may be acquired by searching for in a preset second correspondence table. The first voltages and charging durations are recorded in the preset second correspondence table.

For example, the preset second correspondence table may be illustrated as the above Table 2, which is omitted herein.

For example, when the first voltage acquired by the detecting module 306 is 2.6V, the corresponding charging duration acquired is 28 minutes. That is, the duration ranging between charging the battery with 2.6V to charging the battery with 3.4V is estimated to be 28 minutes.

Based on this, when the battery is charged for 28 minutes, the detecting module 306 may be triggered to detect the second voltage of the battery and to judge whether the second voltage is greater than or equal to the preset voltage threshold of 3.4V. When it is judged that the second voltage is equal to or greater than the preset voltage threshold of 3.4V, the terminal may enter the constant current charge phase.

When it is judged that the second voltage is less than the preset voltage threshold of 3.4V, for example the second voltage is 3.0V, it may be considered that a discharging current is relatively high during the trickle current charge phase. Therefore, the charging duration of the trickle current charge phase is long. A difference between the second voltage and the preset voltage threshold may be computed and it is judged whether the difference is less than a preset difference threshold by the detecting module 306. For example, the preset difference threshold may be 0.4V.

When it is judged that the difference is less than or equal to the preset difference threshold, it may be indicated that the second voltage is close to the preset voltage threshold. In this case, the detecting module 306 may determine the target voltage range from the preset voltage ranges, and may acquire the target charging current corresponding to the target voltage range. The battery may be charged according to the target charging current.

For example, when the difference of 0.4V between the second voltage of 3.0V and the preset voltage threshold of 3.4V is equal to the preset difference threshold, the detecting module 306 may determine the preset voltage range of [3.1, 3.4] as the target voltage range. The battery may be charged according to the target charging current of 550 mA corresponding to the target voltage range of [3.1, 3.4].

It should be understood that, as the second voltage of 3.0V belongs to the preset voltage range of [2.8, 3.1], when the battery is charged according to the charging current corresponding to the preset voltage range of [2.8, 3.1], the battery is charged according to the charging current of 250 mA. However, in the embodiments of the present disclosure, as the second voltage of 3.0V is close to the preset voltage threshold of 3.4V, the battery is charged according to the charging current 550 mA corresponding to the preset voltage range of [3.1, 3.4]. Therefore, the charging speed of the trickle current charge phase may be improved.

The prompting module 307 is configured to acquire a discharging current when it is judged that the difference is larger than the preset difference threshold; and to generate a prompt message when it is detected that the discharging current exceeds a preset discharging current threshold. The prompt message is configured to prompt a user to stop using the terminal so as to improve the charging speed.

For example, when the second voltage acquired by the detecting module 306 is 2.9V, the difference computed by the detecting module 306 between the second voltage of 2.9V and the preset voltage threshold of 3.4V is 0.5V. The difference of 0.5V is greater than the preset difference threshold of 0.4V. It may be considered that this case is caused by the usage of the terminal when the battery is charged. For example, applications having huge power consumption are opened, resulting in a low charging speed.

The prompting module 307 may acquire the discharging current of the battery and may detect whether the discharging current exceeds the preset discharging current threshold.

When it is detected that the discharging current exceeds the preset discharging current threshold (for example, the discharging current is 210 mA, and the preset discharging current threshold is 200 mA), the prompt message is generated by the prompting module 307. The prompt message is configured to prompt the user to stop using the terminal so as to improve the charging speed of the trickle current charge phase.

The control module 308 is configured to control the terminal enter a preset low-power-consumption module.

For example, after the prompt message is output by the prompting module 307 to prompt the user to stop using the terminal, the control module 308 may control the terminal to enter the preset low-power-consumption mode, thereby further improving the charging speed.

It is to be illustrated that, controlling the terminal to enter the preset low-power-consumption mode may be that a display brightness of the terminal is reduced, a volume of the terminal is reduced and the like.

Embodiments of the present disclosure provide a charging terminal. The charging terminal includes: a memory, a processor, and computer programs stored in the memory and executable by the processor. The processor is configured to execute the computer programs to realize a charging method provided in embodiments of the present disclosure.

Figure 6:
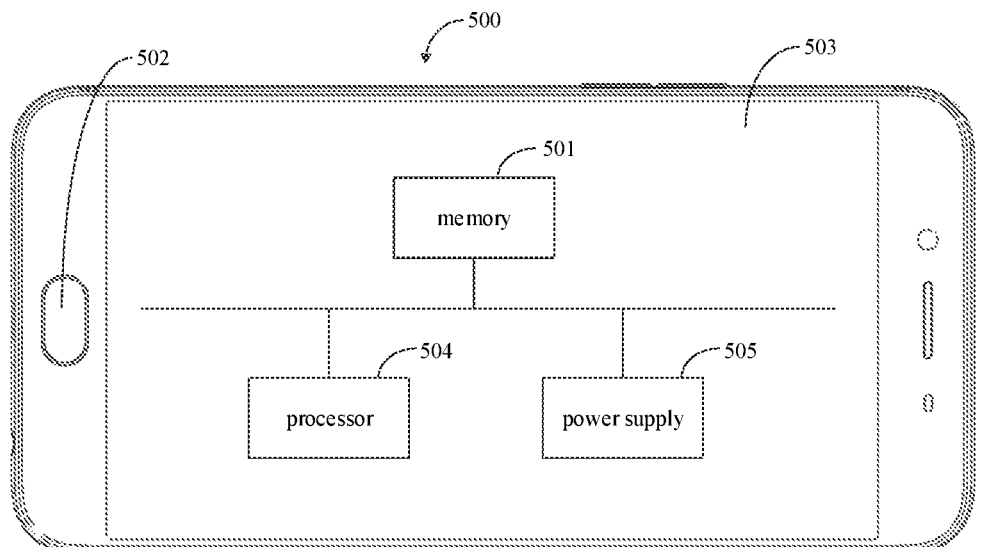
FIG. 6 is a schematic diagram illustrating a mobile terminal according to embodiments of the present disclosure.

In a possible implementation, the terminal may be a mobile terminal, such as a smart phone, a tablet computer and the like. With reference to FIG. 6, FIG. 6 is a schematic diagram illustrating a mobile terminal according to embodiments of the present disclosure. The mobile terminal 500 may include a memory 501 having one or more computer-readable storage mediums, an input unit 502, a display unit 503, a processor 504 including one or more processing kernels, and a power supply 505. It should be understood by a skilled in the art that, a structure illustrated in FIG. 6 is not to limit the mobile terminal. Instead, the mobile terminal may include less or more components. Alternatively, the components included in the mobile terminal may be combined. Alternatively, the mobile terminal may include different arrangements of the components.

The memory 501 is configured to store application programs and data. The application programs stored in the memory 501 includes executable codes. The application programs may compose a variety of functionality modules. The processor 504 is configured to execute a variety of functionality applications and to process data by performing the application programs stored in the memory 501.

The input unit 502 is configured to receive a number, a character or user feature information (such as a fingerprint), and to generate a keyboard, a mouse, an operating level, an optics or a trackball signal related to user settings and functionality controls. In detail, in an embodiment, the input unit 502 may include a touch sensitive surface or another input device. The touch sensitive surface is also called as a touch display or a touch panel, configured to collect touch operations (for example, the operations caused by a finger, a touch pen or a suitable object on the touch sensitive surface or near the touch sensitive surface) on or near the touch sensitive surface, and to drive a corresponding connected device according to a preset regulation.

The display unit 503 is configured to display information input by the user or to display information provided to the user and a variety of graphical user interfaces of a terminal. The graphical user interfaces may be constituted by any combination of graphs, text, logos, videos and the like. The display unit 504 may include a display panel. In a possible implementation, the display panel may be configured with a LCD (Liquid Crystal Display), an OLED (Organic Light-Emitting Diode) and the like.

The processor 504 is a control center of the mobile terminal. The processor 504 may utilize a variety of interfaces and lines to connect each component of the mobile terminal. By performing or running the application programs stored in the memory 501 and by invoking data stored in the memory 501, the processor 504 may execute a variety of functions and data processes of the mobile terminal, thereby monitoring the mobile terminal in a whole.

The mobile terminal further includes the power supply 505 (such as a battery) to provide electric energy for each component. The power supply 505 may be logically connected with the processor 504 through a power management system, thereby controlling a charging function, a discharging function, a power-consumption management function and the like through the power management system. The power supply 505 may include one or more of a DC or AC power supply, a recharging system, a fault detection circuit, a power converter/inverter, a power-status indicator and other components.

Although not illustrated in FIG. 6, the mobile terminal may further include a radio-frequency circuit, an audio circuit, a camera, a Bluetooth module and the like, which are not elaborated herein.

In embodiments, the processor 504 of the mobile terminal may upload executable codes corresponding to one or more application programs to the memory 501 according to following instructions. The processor 504 is configured to execute the application programs stored in the memory 501 to realize followings.

When it is detected that a battery is charged with a trickle current, a voltage of the battery is acquired. A preset voltage range to which the voltage belongs is determined. A charging current corresponding to the preset voltage range is acquired. The battery is charged according to the charging current.

Before detecting that the battery is charged with the trickle current, the processor 504 may further perform followings. Voltage samples are acquired during a trickle current charge phase. A plurality of voltage ranges are generated by sequencing the voltage samples from low to high. The plurality of voltage ranges are determined as a plurality of preset voltage ranges. A plurality of charging currents are set for the plurality of preset voltage ranges. The higher a preset voltage range is, the higher a corresponding charging current is.

The processor 504 may further perform followings. When it starts to charge the battery with the trickle current, a first voltage of the battery is acquired and a charging duration corresponding to the first voltage is acquired. The charging duration ranges between charging the battery with the first voltage to charging the battery with a preset voltage threshold. The preset voltage threshold is a termination voltage of the trickle current charge phase. When it is detected that a charging period of the battery reaches the charging duration, a second voltage is the battery is acquired. When it is judged that the second voltage is less than the preset voltage threshold, a difference between the second voltage and the preset voltage threshold is computed. When it is judged that the difference is less than or equal to a preset difference threshold, a target voltage range is determined from the preset voltage ranges. A target charging current corresponding to the target voltage range is acquired. The battery is charged with the target charging current.

After computing the difference between the second voltage and the preset voltage threshold, the processor 504 may further perform followings. When it is judged that the difference is larger than the preset difference threshold, a discharging current is acquired. When it is judged that the discharging current exceeds a preset discharging current threshold, a prompt message is generated. The prompt message is configured to prompt a user to stop using a terminal so as to improve a charging speed.

After generating the prompt message, the processor 504 may control the terminal enter a preset low-power-consumption mode.

In above embodiments, the above embodiments are described with different emphasis. For those not described herein in detail, detailed descriptions to the above charging method may be referred to, which are not elaborated herein.

The charging device provided in embodiments of the present disclosure has the same idea with the charging method described above. On the charging device, any of embodiments describing the charging method may be performed. Detailed implementations may refer to above embodiments illustrating the charging method, which are not elaborated.

It is to be illustrated that, for the charging method, those skilled in the art may understand that, all or a part of procedures of the charging method may be performed by hardware, under controls of computer programs. The computer programs may be stored in a readable storage medium (such as stored in a memory), and may be executable by at least one processor to perform procedures illustrated by embodiments of the charging method. The storage medium may be a diskette, a CD, a ROM (Read Only Memory), a RAM (Random Access Memory) and the like.

For the charging device provided in embodiments of the present disclosure, each functionality module may be integrated into one processing chip, or each functionality module may be separately from each other, or two or more functionality modules may be integrated into one module chip. The above integrated modules may be realized either in hardware manner or in software manner. When the integrated modules is realized as software functionality modules and are sold or used as a single product, the integrated modules may be stored in a readable storage medium of a computer. For example, the readable storage medium may be a ROM, a magnetic dish, a CD or the like.

Detailed descriptions are made to the above charging method, the charging device and the terminal provided in embodiments of the present disclosure. The principle and implementation of the present disclosure are described by employing specific examples. The specific examples are only used to understand the method and kernel thought of the present disclosure. Moreover, for those skilled in the art, according to the thought of the present disclosure, changes may be made to the above specific embodiments, examples, implementations and application scopes. In conclusion, the above descriptions are not construed to limit the preset disclosure.

What is claimed is:

1. A charging method, comprising:
    when detecting that a battery is charged with a trickle current, acquiring a voltage of the battery;
    determining a preset voltage range to which the voltage belongs;
    acquiring a charging current corresponding to the preset voltage range;

charging the battery according to the charging current,
wherein the method further comprises:
when starting to charge the battery with the trickle current, acquiring a first voltage of the battery, and acquiring a charging duration corresponding to the first voltage, wherein the charging duration ranges between charging the battery with the first voltage to charging the battery with a preset voltage threshold, and the preset voltage threshold is a termination voltage of the trickle current charge phase;
when detecting that a charging period of the battery reaches the charging duration, acquiring a second voltage of the battery;
when judging that the second voltage is less than the preset voltage threshold, computing a difference between the second voltage and the preset voltage threshold;
when judging that the difference is less than or equal to a preset difference threshold, determining a target voltage range from the preset voltage ranges; and
acquiring a target charging current corresponding to the target voltage range, and charging the battery according to the target charging current.

2. The charging method according to claim 1, before detecting that a battery is charged with a trickle current, further comprising:
acquiring voltage samples during a trickle current charge phase that the battery is charged with the trickle current, and generating a plurality of voltage ranges by sequencing the voltage samples from low to high;
determining the plurality of voltage ranges as a plurality of preset voltage ranges; and
setting a plurality of charging currents for the plurality of voltage ranges, wherein the higher a preset voltage range is, the higher a corresponding charging current is.

3. The charging method according claim 1, wherein determining a target voltage range from the preset voltage ranges comprises:
determining a preset voltage range that is larger than a preset voltage range to which the second voltage belongs as the target voltage range.

4. The charging method according claim 1, after computing a difference between the second voltage and the preset voltage threshold, further comprising:
when judging that the difference is larger than the preset difference threshold, acquiring a discharging current; and
when judging that the discharging current exceeds a preset discharging current threshold, generating a prompt message, wherein the prompt message is configured to prompt a user to stop using a terminal so as to improve a charging speed.

5. The charging method according to claim 4, wherein after generating a prompt message, further comprising:
controlling the terminal to enter a preset low-power-consumption mode.

6. The charging method according to claim 4, further comprising:
when judging that the discharging current does not exceed the preset discharging current threshold, improving the charging current.

7. The charging method according to claim 1, wherein the charging current corresponding to the preset voltage range is a constant, or a variable that changes linearly during the preset voltage range.

8. The charging method according to claim 1, wherein a corresponding between charging currents and preset voltage ranges is preset.

9. The charging method according to claim 1, wherein a corresponding between first voltages and charging durations is preset.

10. A terminal, comprising: a memory, a processor and computer programs stored in the memory and executable by the processor, wherein the processor is configured to execute the computer programs to achieve a charging method, and the charging method comprises:
when detecting that a battery is charged with a trickle current, acquiring a voltage of the battery;
determining a preset voltage range to which the voltage belongs;
acquiring a charging current corresponding to the preset voltage range; and
charging the battery according to the charging current,
wherein the method further comprises:
when starting to charge the battery with the trickle current, acquiring a first voltage of the battery, and acquiring a charging duration corresponding to the first voltage, wherein the charging duration ranges between charging the battery with the first voltage to charging the battery with a preset voltage threshold, and the preset voltage threshold is a termination voltage of the trickle current charge phase;
when detecting that a charging period of the battery reaches the charging duration, acquiring a second voltage of the battery;
when judging that the second voltage is less than the preset voltage threshold, computing a difference between the second voltage and the preset voltage threshold;
when judging that the difference is less than or equal to a preset difference threshold, determining a target voltage range from the preset voltage ranges; and
acquiring a target charging current corresponding to the target voltage range, and charging the battery according to the target charging current.

11. The terminal according to claim 10, wherein the charging method further comprises:
before detecting that a battery is charged with a trickle current, acquiring voltage samples during a trickle current charge phase that the battery is charged with the trickle current, and generating a plurality of voltage ranges by sequencing the voltage samples from low to high;
determining the plurality of voltage ranges as a plurality of preset voltage ranges; and
setting a plurality of charging currents for the plurality of voltage ranges, wherein the higher a preset voltage range is, the higher a corresponding charging current is.

12. The terminal according to claim 10, wherein determining a target voltage range from the preset voltage ranges comprises:
determining a preset voltage range that is larger than a preset voltage range to which the second voltage belongs as the target voltage range.

13. The terminal according to claim 10, wherein the method further comprises:
after computing a difference between the second voltage and the preset voltage threshold, when judging that the difference is larger than the preset difference threshold, acquiring a discharging current; and
when judging that the discharging current exceeds a preset discharging current threshold, generating a prompt message, wherein the prompt message is configured to prompt a user to stop using a terminal so as to improve a charging speed.

14. The terminal according to claim 13, wherein the method further comprises:
    after generating a prompt message, controlling the terminal to enter a preset low-power-consumption mode.

15. The terminal according to claim 13, wherein the method further comprises:
    when judging that the discharging current does not exceed the preset discharging current threshold, improving the charging current.

16. The terminal according to claim 10, wherein the charging current corresponding to the preset voltage range is a constant, or a variable that changes linearly during the preset voltage range.

17. The terminal according to claim 10, wherein a corresponding between charging currents and preset voltage ranges is preset; and a corresponding between first voltages and charging durations is preset.

18. A non-transitory computer-readable storage medium having stored therein instructions that, when executed by a processor of a mobile terminal, causes the mobile terminal to perform a charging method, the charging method comprising:
    when detecting that a battery is charged with a trickle current, acquiring a voltage of the battery;
    determining a preset voltage range to which the voltage belongs;
    acquiring a charging current corresponding to the preset voltage range; and
    charging the battery according to the charging current, wherein the method further comprises:
    when starting to charge the battery with the trickle current, acquiring a first voltage of the battery, and acquiring a charging duration corresponding to the first voltage, wherein the charging duration ranges between charging the battery with the first voltage to charging the battery with a preset voltage threshold, and the preset voltage threshold is a termination voltage of the trickle current charge phase;
    when detecting that a charging period of the battery reaches the charging duration, acquiring a second voltage of the battery;
    when judging that the second voltage is less than the preset voltage threshold, computing a difference between the second voltage and the preset voltage threshold;
    when judging that the difference is less than or equal to a preset difference threshold, determining a target voltage range from the preset voltage ranges; and
    acquiring a target charging current corresponding to the target voltage range, and charging the battery according to the target charging current.

* * * * *